United States Patent
Yoshida (10) Patent No.: US 9,934,563 B2
(45) Date of Patent: Apr. 3, 2018

(54) 3D OBJECT ROTATION-BASED MECHANICAL PARTS SELECTION THROUGH 2D IMAGE PROCESSING

(71) Applicant: EMPIRE TECHNOLOGY DEVELOPMENT LLC, Wilmington, DE (US)

(72) Inventor: Naofumi Yoshida, Tokyo (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 111 days.

(21) Appl. No.: 14/926,011

(22) Filed: Oct. 29, 2015

(65) Prior Publication Data
US 2017/0124692 A1    May 4, 2017

(51) Int. Cl.
*G06T 7/00* (2017.01)
*G06T 3/60* (2006.01)
(Continued)

(52) U.S. Cl.
CPC ........ *G06T 7/0004* (2013.01); *G06K 9/00208* (2013.01); *G06K 9/64* (2013.01);
(Continued)

(58) Field of Classification Search
CPC ......... G06T 7/004; G06T 7/0051; G06T 3/60; G06T 2207/30164; G06T 2200/00; G06T 2219/2016; G06T 7/0004
See application file for complete search history.

(56) References Cited

U.S. PATENT DOCUMENTS 6,026,188 A * 2/2000 Dionysian .......... G06K 9/00288
348/139
6,763,148 B1 7/2004 Sternberg et al.
(Continued)

OTHER PUBLICATIONS

"Munsell Color system," accessed at http://web.archive.org/web/20150708101342/https://en.wikipedia.org/wiki/Munsell_color_system, Last modified on Jul. 7, 2015, pp. 9.
(Continued)

*Primary Examiner* — Sean Conner
*Assistant Examiner* — Pinalben Patel
(74) *Attorney, Agent, or Firm* — Turk IP Law, LLC (57) ABSTRACT

Technologies are generally described for 3D object recognition through 2D image processing based on white balancing and object-rotation in machine vision systems. According to some examples, image recognition of an object captured with a camera under insufficient lighting may be achieved through white balancing. Processing cost reduction may be achieved in the learning process for image recognition through automatic generation of rotated 2D images of target objects to be detected, such as machine parts, from a small number of 2D images of a target object and generation of a 3D image of the target object from the rotated 2D images. Image recognition may thus be ensured even under insufficient lighting through execution of the image recognition process for multiple images and learning the successful recognition results. Some examples may be implemented in mechanical parts selection, where 2D images of the parts may be available beforehand.

24 Claims, 8 Drawing Sheets

(51) Int. Cl.
*G06K 9/64* (2006.01)
*G06K 9/00* (2006.01)

(52) U.S. Cl.
CPC ............ *G06T 3/60* (2013.01); *G06K 2209/19* (2013.01); *G06T 2200/04* (2013.01); *G06T 2207/30164* (2013.01); *G06T 2219/2016* (2013.01)

(56) References Cited

U.S. PATENT DOCUMENTS

| | | | |
|---|---|---|---|
| 6,888,960 B2 | 5/2005 | Penev et al. | |
| 7,221,809 B2* | 5/2007 | Geng | G06K 9/00288 345/419 |
| 8,150,101 B2* | 4/2012 | Haanpaa | G06K 9/0063 382/103 |
| 8,369,617 B2* | 2/2013 | Bamidele | H04N 1/6052 382/165 |
| 9,336,625 B2* | 5/2016 | Evertt | G06K 9/00201 |
| 9,424,461 B1* | 8/2016 | Yuan | G06K 9/00201 |
| 2001/0048465 A1 | 12/2001 | Toyofuku et al. | |
| 2009/0066490 A1* | 3/2009 | Mitzutani | G06K 9/00362 340/435 |
| 2011/0058733 A1 | 3/2011 | Inoue et al. | |
| 2011/0194732 A1 | 8/2011 | Tsuji | |
| 2012/0288156 A1 | 11/2012 | Kido | |
| 2013/0085329 A1 | 4/2013 | Morrissette et al. | |
| 2014/0037203 A1 | 2/2014 | Garcia Morato Fernandez Baillo et al. | |
| 2014/0294292 A1* | 10/2014 | Aoba | G06K 9/00208 382/159 |
| 2014/0368685 A1 | 12/2014 | Venkataraman et al. | |
| 2018/0005446 A1* | 1/2018 | Elazary | G06T 19/006 |

OTHER PUBLICATIONS

"Outline of Object Identification," accessed at http://web.archive.org/web/20150418180250/http://en.wikipedia.org/wiki/Outline_of_object_recognition, last modified on Feb. 1, 2015, pp. 10.

Albert, M., et al., "Safety Principles for Industrial Robots," accessed at http://www.ilo.org/oshenc/part-viii/safety-applications/item/972-safety-principles-for-industrial-robots, Encyclopedia of Occupational Health and Safety, pp. 5 (2011).

Belongie, S., et al., "Shape matching and object recognition using shape contexts," IEEE Transactions on Pattern Analysis and Machine Intelligence, vol. 24, Issue 4, pp. 509-522 (Apr. 2002).

Kholgade, N., et al., "3D Object Manipulation in a Single Photograph using Stock 3D Models," Proceedings of ACM SIGGRAPH 2014 Transactions on Graphics (TOG), vol. 33, Issue 4, pp. 1-13 (Jul. 2014).

Okamura, J-Y., et al., "Neural Substrates of View-Invariant Object Recognition Developed without Experiencing Rotations of the Objects," The Journal of Neuroscience, vol. 34, No. 45, pp. 15047-15059 (Nov. 5, 2014).

International Search Report and Written Opinion for International Application No. PCT/US2016/050892 dated Dec. 12, 2016, pp. 10.

* cited by examiner

COMPUTER PROGRAM PRODUCT 800

SIGNAL-BEARING MEDIUM 802

804 ONE OR MORE INSTRUCTIONS TO

OBTAIN IMAGES OF AN OBJECT, WHERE EACH IMAGE CORRESPONDS TO A DISTINCT WHITE BALANCE VALUE AND A ROTATION STATE OF THE OBJECT;
STORE THE IMAGES ALONG WITH AN IMAGE IDENTIFIER FOR EACH IMAGE, A PARTS IDENTIFIER COMMON TO ONE OR MORE IMAGES, AND A WEIGHT VALUE FOR EACH IMAGE; AND/OR
PROVIDE ONE OR MORE IMAGES OF THE OBJECT TO AN IMAGE RECOGNITION MODULE SUCH THAT THE OBJECT IS RECOGNIZED BY THE IMAGE RECOGNITION MODULE BASED ON A COMPARISON OF THE PROVIDED ONE OR MORE IMAGES TO A CAPTURED IMAGE OF THE OBJECT.

| COMPUTER-READABLE MEDIUM 806 | RECORDABLE MEDIUM 808 | COMMUNICATIONS MEDIUM 810 |

FIG. 8

3D OBJECT ROTATION-BASED MECHANICAL PARTS SELECTION THROUGH 2D IMAGE PROCESSING

BACKGROUND

Unless otherwise indicated herein, the materials described in this section are not prior art to the claims in this application and are not admitted to be prior art by inclusion in this section.

Accurate identification and classification of a large number of components using a typical 2D camera under insufficient lighting is one of the challenges in image recognition. For example, object identification may involve detection of the edges of an object in an image. Without sufficient lighting, the edges may be undetectable. Thus, satisfactory image recognition may not be achieved without sufficient lighting. Detection of an orientation of the object may present another challenge. Typically, the orientation of a rotating object in an image may be unknown at the time of image acquisition. The lack of orientation information may increase a possibility of misidentification of the object. Image recognition of a rotating object may be achieved by recognizing an object in rotated and unrotated states as being the same object. That is, images of the object in rotated and unrotated states need both to be learned to achieve correct recognition of the object in a target image. Conventional approaches of creating a 3D object from 2D images involve an operator assigning individual 3D coordinates to the image.

SUMMARY

The present disclosure generally describes techniques for 3D object rotation-based mechanical parts selection through 2D image processing based on white balancing and object-rotation in machine vision systems.

According to some examples, a method for 3D object recognition through rotation-based 2D image processing is described. An example method may include obtaining images of an object, where each image corresponds to a distinct white balance value and a rotation state of the object; storing the images along with an image identifier for each image, a parts identifier common to one or more images, and a weight value for each image, where the parts identifier indicates images that are associated with a single object; and in response to a request from an image recognition module, providing one or more images of the object to an image recognition module such that the object is recognized by the image recognition module based on a comparison of the provided one or more images to a captured image of the object.

According to other examples, a method for 3D object recognition through rotation-based 2D image processing is described. The method may include receiving a captured image of a target object; receiving images from an image database, along with an image identifier for each image, a parts identifier common to one or more images, and a weight value for each image, where the parts identifier indicates images that are associated with an object, and where each image corresponds to a distinct white balance value and a rotation state of the object; comparing the images to the captured image of the target object; and in response to a determination that one of the images matches the captured image of the target object, recognizing the target object as the object associated with the one of the images.

According to further examples, a system for 3D object rotation-based mechanical parts selection through 2D image processing is described. The system may include a detection control module configured to obtain images of an object, where each image corresponds to a distinct white balance value and a rotation state of the object; store the images along with an image identifier for each image, a parts identifier common to one or more images, and a weight value for each image, where the parts identifier indicates images that are associated with a single object; and in response to a request from an image recognition module, provide one or more images of the object to the image recognition module such that the object is recognized by the image recognition module based on a comparison of the provided one or more images to a captured image of the object.

According to yet other examples, a system for 3D object rotation-based mechanical parts selection through 2D image processing is described. The system may include a detection control module configured to obtain images of an object, where each image corresponds to a distinct white balance value and a rotation state of the object; store the images along with an image identifier for each image, a parts identifier common to one or more images, and a weight value for each image, where the parts identifier indicates images that are associated with a single object; and in response to a request from an image recognition module, provide one or more images of the object to the image recognition module such that the object is recognized by the image recognition module based on a comparison of the provided one or more images to a captured image of the object. The system may also include an image capture device configured to capture an image of a target object and an object recognition module configured to receive the one or more of the images from the detection control module; compare the one or more of the images to the captured image of the target object; and in response to a determination that one of the images matches the captured image of the target object, recognize the target object as the object associated with the one of the images.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, among other things, to methods, apparatus, systems, devices, and/or computer program products related to three-dimensional (3D) object rotation-based mechanical parts selection through two-dimensional (2D) image processing based on white-balancing and object-rotation in machine vision systems.

Briefly stated, technologies are generally described for 3D object recognition through 2D image processing based on white balancing and object-rotation in machine vision systems. According to some examples, image recognition of an object captured with a camera under insufficient lighting may be achieved through white balancing. Processing cost reduction may be achieved in the learning process for image recognition through automatic generation of rotated 2D images of target objects to be detected, such as machine parts, from a small number of 2D images of a target object and generation of a 3D image of the target object from the rotated 2D images. Image recognition may thus be ensured even under insufficient lighting through execution of the image recognition process for multiple images and learning the successful recognition results. Some examples may be implemented in mechanical parts selection, where 2D images of the parts may be available beforehand.

Figure 1:
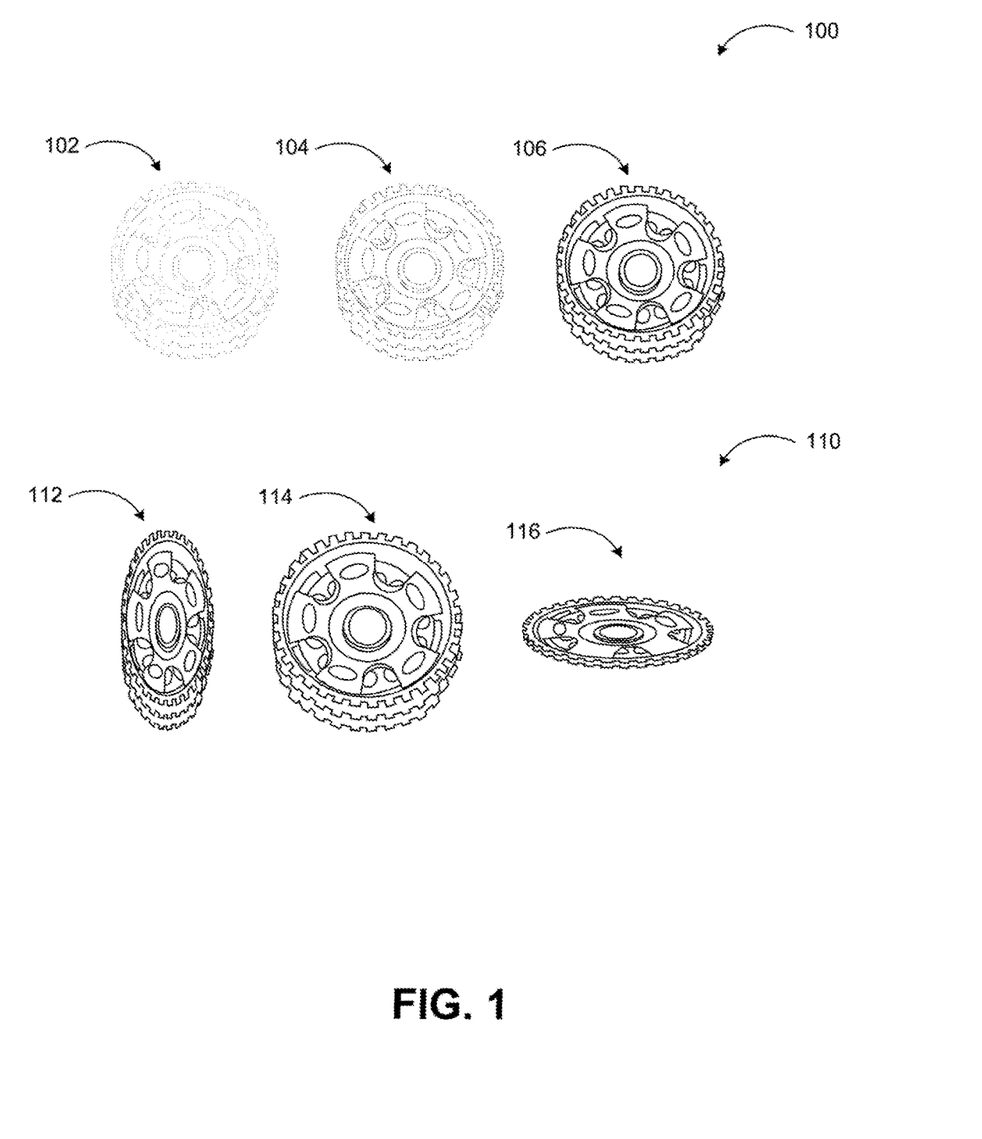
FIG. 1 illustrates example images of objects with different white balance values and at different angles, where the parts may be used in 3D object rotation-based mechanical parts selection through 2D image processing.

FIG. 1 illustrates example images of objects with different white balance values and at different angles, where the parts may be used in 3D object rotation-based mechanical parts selection through 2D image processing, arranged in accordance with at least some embodiments described herein.

Part selection or picking is a component of manufacturing processes in many industries. For example, for a large variety of manufactured goods, a number of parts used in assembly may range from a few to many. Sizes, shapes, and types of parts may also vary substantially. In automated assembly processes, speed and accuracy are two metrics that may determine success of the process. Thus, rapid and accurate selection and placement of parts becomes the goal for such processes. While parts may be pre-processed (e.g., placed in special containers in predetermined orientations, such pre-processing may increase the cost of manufacturing. With the developments in image recognition, parts may be picked by robotic assemblers using object recognition. However, less than ideal conditions such as lighting, varying orientation of parts, etc., may result in higher than desired error rates or a need for use of computationally and/or financially expensive systems to improve object recognition success rate. One of a number of aspects needed to achieve successful object recognition includes accurate detection of an outline (or edges) of a target object even under less than ideal lighting conditions.

As shown in a diagram 100, an image of a three-dimensional (3D) target object may be acquired at different exposure levels or settings to obtain images 102, 104, 106 at different white balance values. Alternatively, the images 102, 104, 106 at different white balance values may be obtained from a single captured image of the target object using image processing (e.g., post-processing the captured image to vary the white balance values).

As shown in a diagram 110, the image of the 3D target object may also be acquired at different rotation states to obtain images 112, 114, 116 with the target object at different rotation states (tilts). Alternatively, the images 112, 114, 116 at different rotation states may be obtained from a single captured image of the target object using image processing (e.g., post-processing the captured image to vary the rotation state through tilting around a central symmetry axis).

The images 102, 104, 106 at different white balance values and/or the images 112, 114, 116 at different rotation states may be stored in an image database and may be used to train a machine learning based object recognition system, which may detect objects and/or their orientations based on a comparison of a captured image of the target object to the image database as discussed herein.

Figure 2:
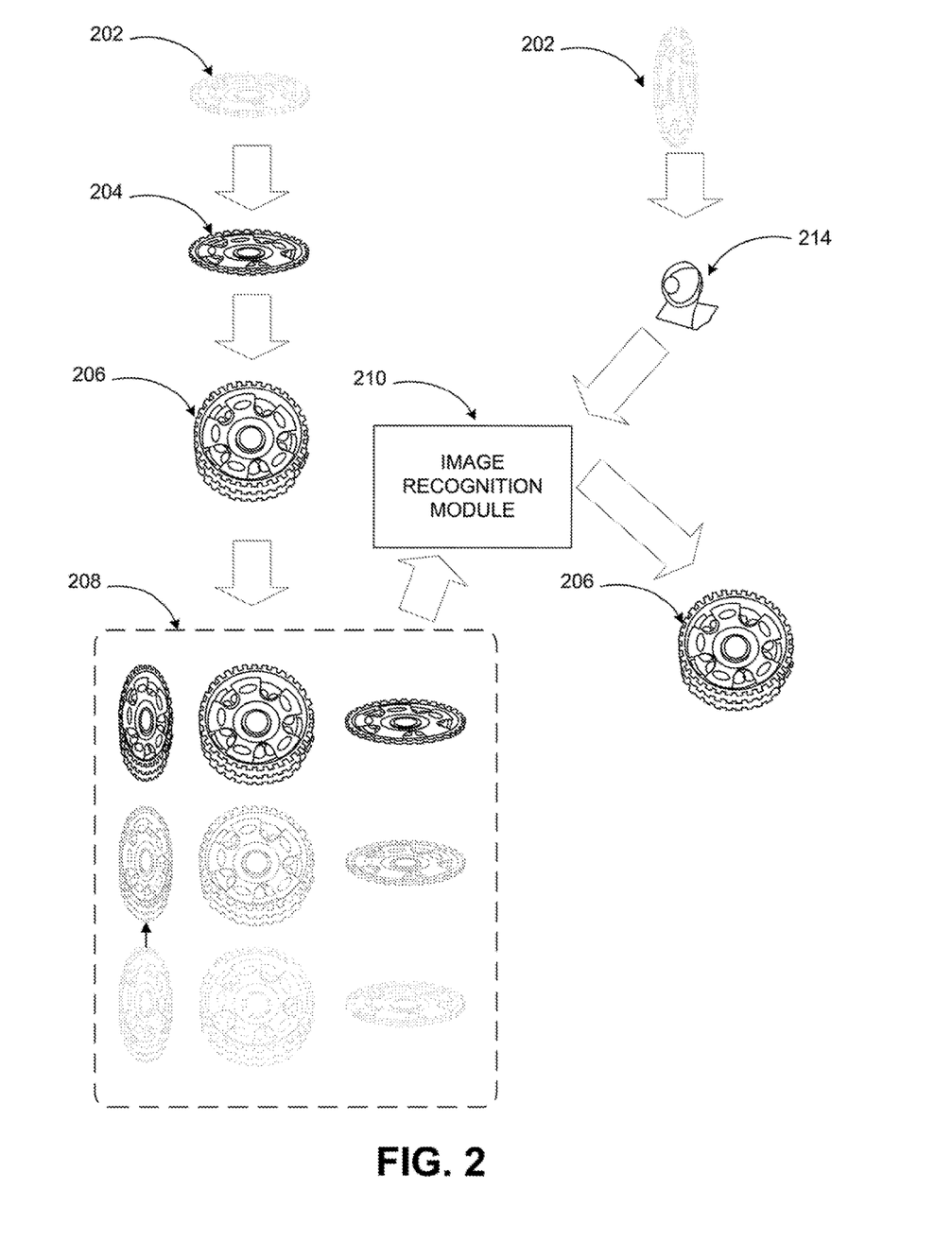
FIG. 2 illustrates example operations and components of a system for 3D object rotation-based mechanical parts selection through 2D image processing.

FIG. 2 illustrates example operations and components of a system for 3D object rotation-based mechanical parts selection through 2D image processing, arranged in accordance with at least some embodiments described herein.

As shown in a diagram 200, an image 202 of a target object may be received by a learning component of an object recognition system. The received image 202 may be used to generate a set of images 204 at different white balance values and another set of images 206 at different rotation states. The increments of white balance values and rotation states may be selected based on computational cost, available resources (e.g., memory, data storage, network bandwidth). A resulting set of images 208 may represent various permutations of white balance values and rotation states for the target object. In other embodiments, the set of images 208 may be captured individually at same or similar white balance values and rotation states. The set of images 208 may be stored in an image database and individually weighted. The set of images 208 and/or the assigned weights may be updated during subsequent object recognition processes based on successful recognition results. For example, captured images of a successfully recognized target object may be added to the database, weight values of images in the database used for the successful recognition of the target object may be increased, and so on.

At a second portion of the object recognition process, an image 212 of the target object may be captured (e.g., at part selection time) by an image capture device 214 and provided to an image recognition module 210. The image recognition module 210 may compare the captured image 212 to the set of images 208 in the image database using the respective weight values and recognize the object 216. A rotation state of the object 216 may also be recognized to aid in picking and placement of the object 216 in an assembly process.

Figure 3:
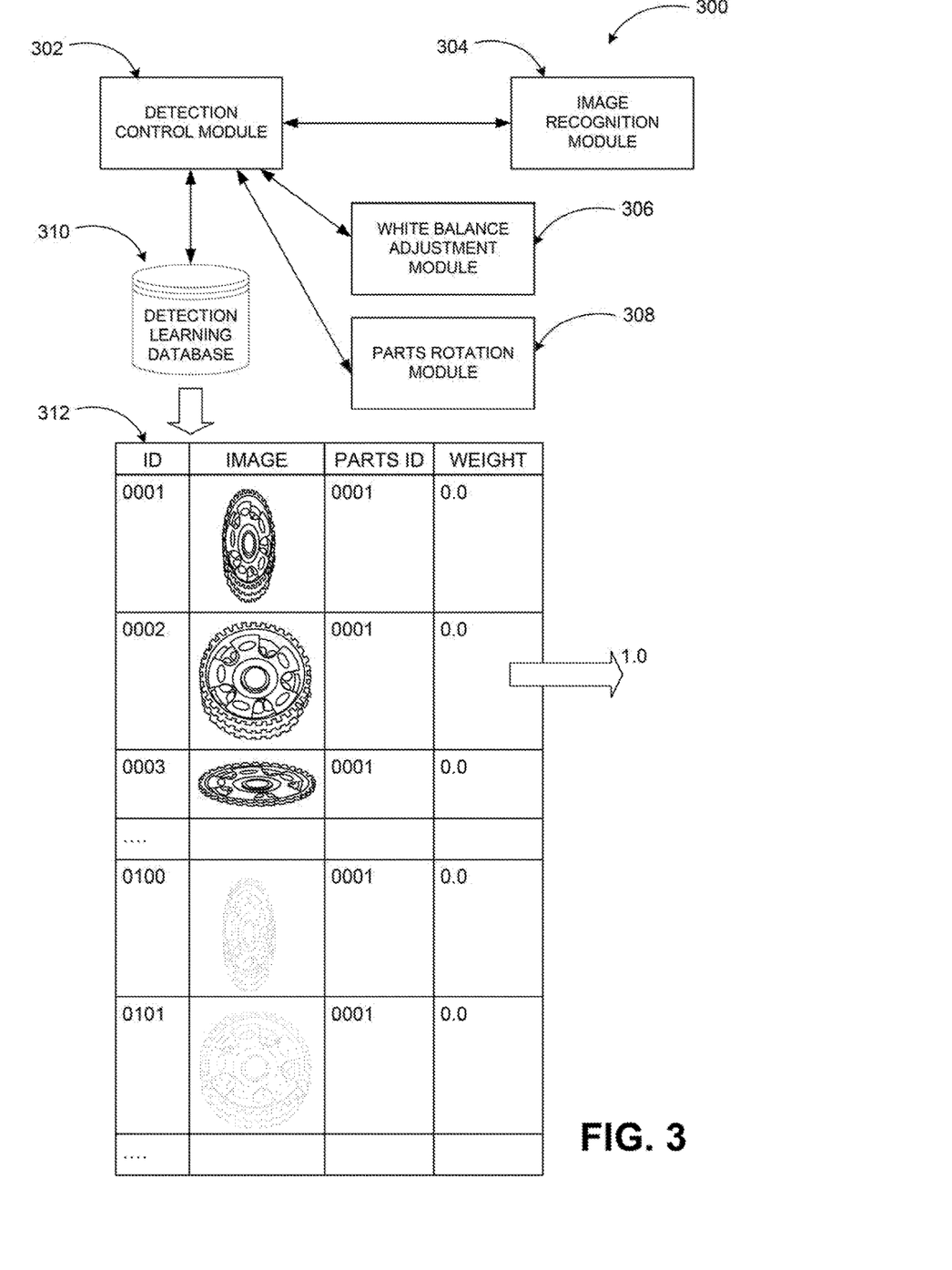
FIG. 3 illustrates example modules of a system for 3D object rotation-based mechanical parts selection through 2D image processing and an example data structure of a database used in the example system.

FIG. 3 illustrates example modules of a system for 3D object rotation-based mechanical parts selection through 2D image processing and an example data structure of a database used in the example system, arranged in accordance with at least some embodiments described herein.

As shown in a diagram 300, a detection control module 302 may receive an image of a target object and manage processing of the image by a white balance adjustment module 306 and/or a parts rotation module 308 in order to generate a set of images at different white balance values and rotation states. The detection control module 302 may store the images in a detection learning database 310 (also referred to as image database herein) for subsequent object recognition by an image recognition module 304. The detection learning database 310 may include identifiers for the different images and weight values associated with successful object recognition.

The detection control module 302, the white balance adjustment module 306, the parts rotation module 308, and the image recognition module 304 may be distinct modules implemented as hardware, software, or combinations thereof. The modules may also be integrated components of one or more systems. For example, the detection control module 302, the white balance adjustment module 306, and the parts rotation module 308 may be part of an image database service that can be accessed by a number of assembly control services, and the image recognition module 304 may be part of an assembly control service along with part picking and placement modules.

A data structure 312 of the detection learning database 310 is also illustrated in the diagram 300. Each image may be assigned image identifiers. Images of a same object at different white balance values and/or rotation state values may be assigned an identical parts identifier (indicating that these images belong to the same object). Each image may also be weighted. For example, the initial values may be set to a predetermined value (0.0, for example). The weight of an image that has been successfully detected (and stored in the database) may be updated (1.0, for example).

In the image recognition process, sequential images of the same object having different white balance values may automatically generated or captured according to predetermined configurations. The images may be automatically supplemented so as to match the images to a captured image of a target object having a selected white balance value, thus enabling successful image recognition even with unsatisfactory lighting. Images of the target object (e.g., an industrial machine part) may also be rotated without correction based on the symmetry and metal luster of the part. Image recognition may be carried out to detect the target object in the automatically generated images having different white balance values and rotated states. The automatically generated images may be weighted, and the results of image recognition may be learned. The learning may provide a process that can achieve highly successful image recognition in a few or even a single learning iteration.

An example system according to some embodiments may remove noise in captured or received image(s) caused by reflection of lights from other objects to reduce misrecognition of objects. Light reflection makes line symmetry, thus, a centerline may be detected by linear pixel manipulation, for example. Next, a center point or centerline of symmetry for the target object may be detected from symmetry characteristics of parts. Using the reflection of lights, an angle of the object may detected relative to other objects. Thus, candidate 3D coordinates of the target object may be determined from the images. After the detection of the candidate 3D coordinates, the object may be determined among the candidates by eliminating inconsistency of lights reflection, rotation, and the center point or line objects, using the captured image of the target object.

Feature extraction, similarity calculation, and image matching are some conventional object recognition techniques that may involve higher consumption of resources such as computing capacity, memory, etc. A system according to embodiments may not need feature extraction because detection of 2D objects is used. Similarity calculation of images may also not be needed, because 2D objects may be detected and assigned 3D coordinates automatically. Furthermore, image matching is also not needed because 3D coordinates may be detected using mechanical symmetry.

Figure 4:
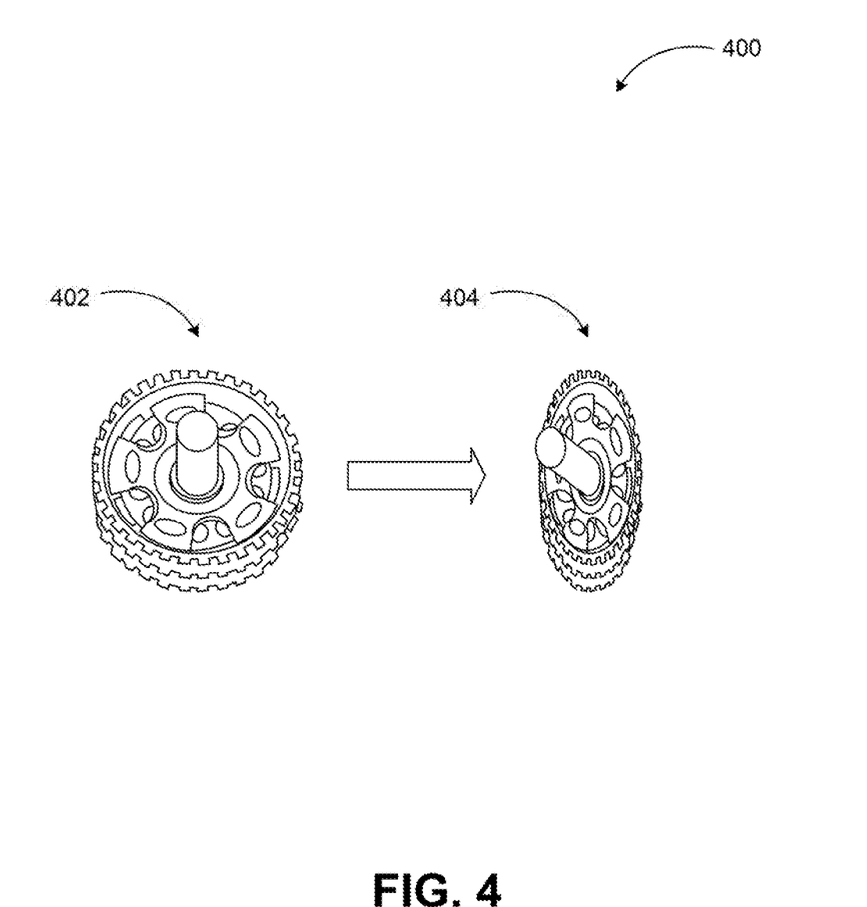
FIG. 4 illustrates conceptually an example 3D object rotation from 2D images.

FIG. 4 illustrates conceptually an example 3D object rotation from 2D images, arranged in accordance with at least some embodiments described herein.

As shown in a diagram 400, a 2D object image 402 may be used to generate a rotated object image 404. An outline extraction may be performed to cut out a part from the 2D object image 402. A central axis of symmetry may be detected based on the symmetrical or substantially symmetrical features of the object, and then the image of the part may be expanded and contracted around the detected central axis. The image of the object may be further expanded and contracted around an axis that is perpendicular to the detected central axis. A metal luster or reflectivity of the object or portions of the object may also be detected to extract outlines of portions of the object close to and remote from the image capture device to determine a depth and a closest portion of the object. The closest portion detected may be combined with the images of the object acquired in earlier parts of the process in projection areas corresponding to a rotational angle resulting in the rotated object image 404. The process may be automatically performed.

Figure 5:
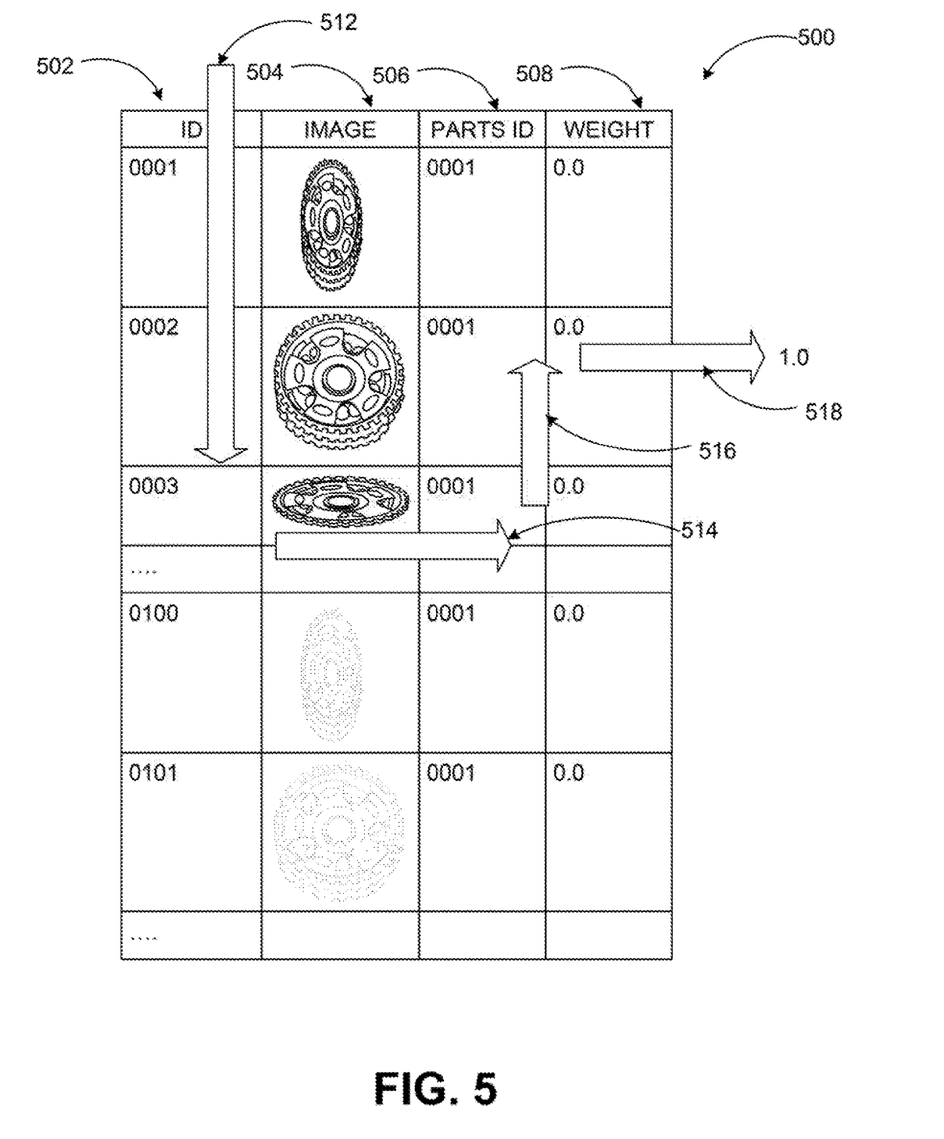
FIG. 5 illustrates an example update process of the data structure of the database used in the example system.

FIG. 5 illustrates an example update process of the data structure of the database used in the example system, arranged in accordance with at least some embodiments described herein.

As shown in a diagram 500, an input target image to be detected may be sequentially matched (512) with images in a detection learning database. The database may include image data 504, image identifiers 502, parts identifiers 506, and weights 508 for each image stored in the database. When the target image is found to match an image in the database (514), multiple images having the same parts identifier (516) may be output (518) to an image recognition module. The image recognition module may perform image recognition (for example, face recognition or object recognition) to detect the target image in the images having the same parts identifiers and output the identifier of the image detected with a highest accuracy as the result of the image recognition process, for example. In response, a detection module may update the weight associated with the matching image in the database. A request for a subsequent recognition process may be sent together with the weight to the image recognition module. Thus, the image recognition module may preferentially process a target image with high accuracy and a high processing rate. The recognition process may be carried out in real-time because the automatically generated images having different white balance values and rotated states may be matched with the target image for recognition.

The learning process may be summarized as follows: (1) If a new image is to be captured with a camera that can vary the exposure level or setting, a predetermined number of pictures having different white balance values may be acquired. If the exposure cannot be varied, one picture may be acquired and processed to generate the predetermined number of pictures having different white balance values. (2) The images may be rotated to generate multiple images in different rotation states. (3) The white balance values and rotation states of the images may be incrementally varied to generate even more images. (4) The generated images may be stored in accordance with a data structure as discussed above.

The recognition process may be summarized as follows: (1) A first image of a target object to be detected may be received (or acquired). (2) The received (first) image and the images in the database may be matched to retrieve a parts identifier (for images belonging to the same object). (3) If there is no match, the white balance value of the received image may be optimized to generate a second image. The second image and the images in the database may be matched to retrieve a parts identifier. (4) If there is still not match, the second image may be rotated to generate a third image of the object in the first image. The third image and the images in the database may be matched to retrieve a parts identifier. (5) If the matching image in the database is weighted, the weight may also be sent to the image recognition module and processed with a priority according to its weight value. (6) Based on a result of the image recognition process, the weight may be updated for an image detected with high accuracy.

Embodiments may be implemented, for example, in recognition of industrial parts in a factory with a camera installed on a robot arm. Images may be acquired and detected for image recognition in real time even with a small number of repetitions of a learning process of rotating parts under insufficient lighting. Embodiments may also be implemented in automatic 3D modelling of machine parts. A 3D object may be generated from a photograph and output from a 3D printer, reducing an amount of time for the production of a prototype.

Figure 6:
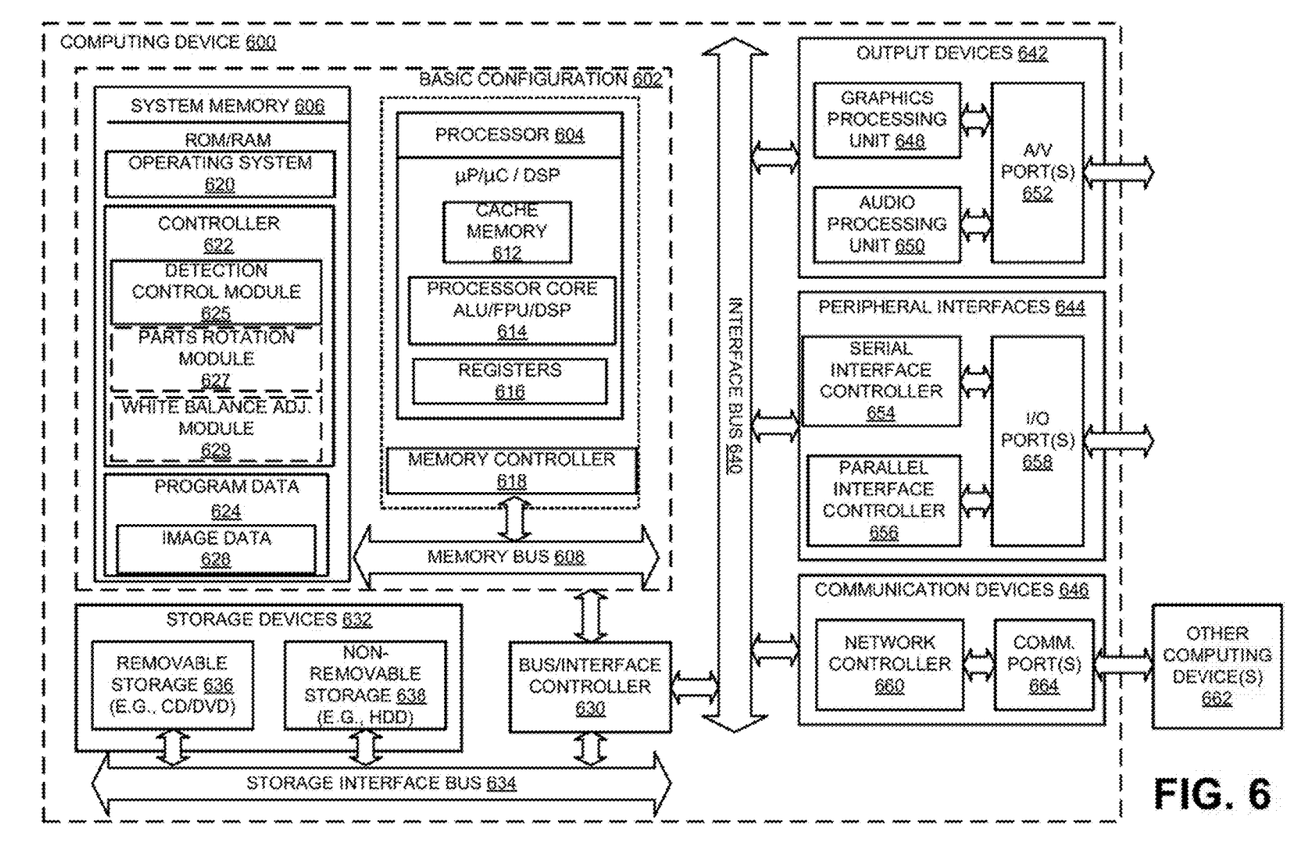
FIG. 6 illustrates a general purpose computing device, which may be used to provide 3D object rotation-based mechanical parts selection through 2D image processing.

FIG. 6 illustrates a general purpose computing device, which may be used to provide 3D object rotation-based mechanical parts selection through 2D image processing, arranged in accordance with at least some embodiments described herein.

For example, the computing device 600 may be used to use orientation markers to determine object orientation and/or deformation as described herein. In an example basic configuration 602, the computing device 600 may include one or more processors 604 and a system memory 606. A memory bus 608 may be used to communicate between the processor 604 and the system memory 606. The basic configuration 602 is illustrated in FIG. 6 by those components within the inner dashed line.

Depending on the desired configuration, the processor 604 may be of any type, including but not limited to a microprocessor (µP), a microcontroller (µC), a digital signal processor (DSP), or any combination thereof. The processor 604 may include one more levels of caching, such as a level cache memory 612, a processor core 614, and registers 616. The example processor core 614 may include an arithmetic logic unit (ALU), a floating point unit (FPU), a digital signal processing core (DSP Core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.) or any combination thereof. The system memory 606 may include an operating system 620, a controller 622, and program data 624. The controller 622 may include a detection control module 625, a parts rotation module 627, and a white balance adjustment module 629 to implement 3D object recognition through 2D image processing based on white balancing and object-rotation in machine vision systems as described herein. The program data 624 may include, among other data, image data 628 to be used in recognition of objects, as described herein.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices include magnetic disc devices such as flexible disc drives and hard-disc drives (HDD), optical disc drives such as compact disc (CD) drives or digital versatile disc (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile discs (DVD), solid state drives, or other optical storage, magnetic cassettes, magnetic tape, magnetic disc storage or other magnetic storage devices, or any other medium which may be used to store the desired information and which may be accessed by the computing device 600. Any such computer storage media may be pan of the computing device 600.

The computing device 600 may also include an interface bus 640 for facilitating communication from various interface devices (e.g., one or more output devices 642, one or more peripheral interfaces 644, and one or more communication devices 646) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device may include a network controller 660, which may be arranged to facilitate communications with one or more other computing devices 662 over a network communication link via one or more communication ports 664. The one or more other computing devices 662 may include servers at a datacenter, customer equipment, and comparable devices.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer that includes any of the above functions. The computing device 600 may also be implemented as a personal computer including both laptop computer and non-laptop computer configurations.

Figure 7:
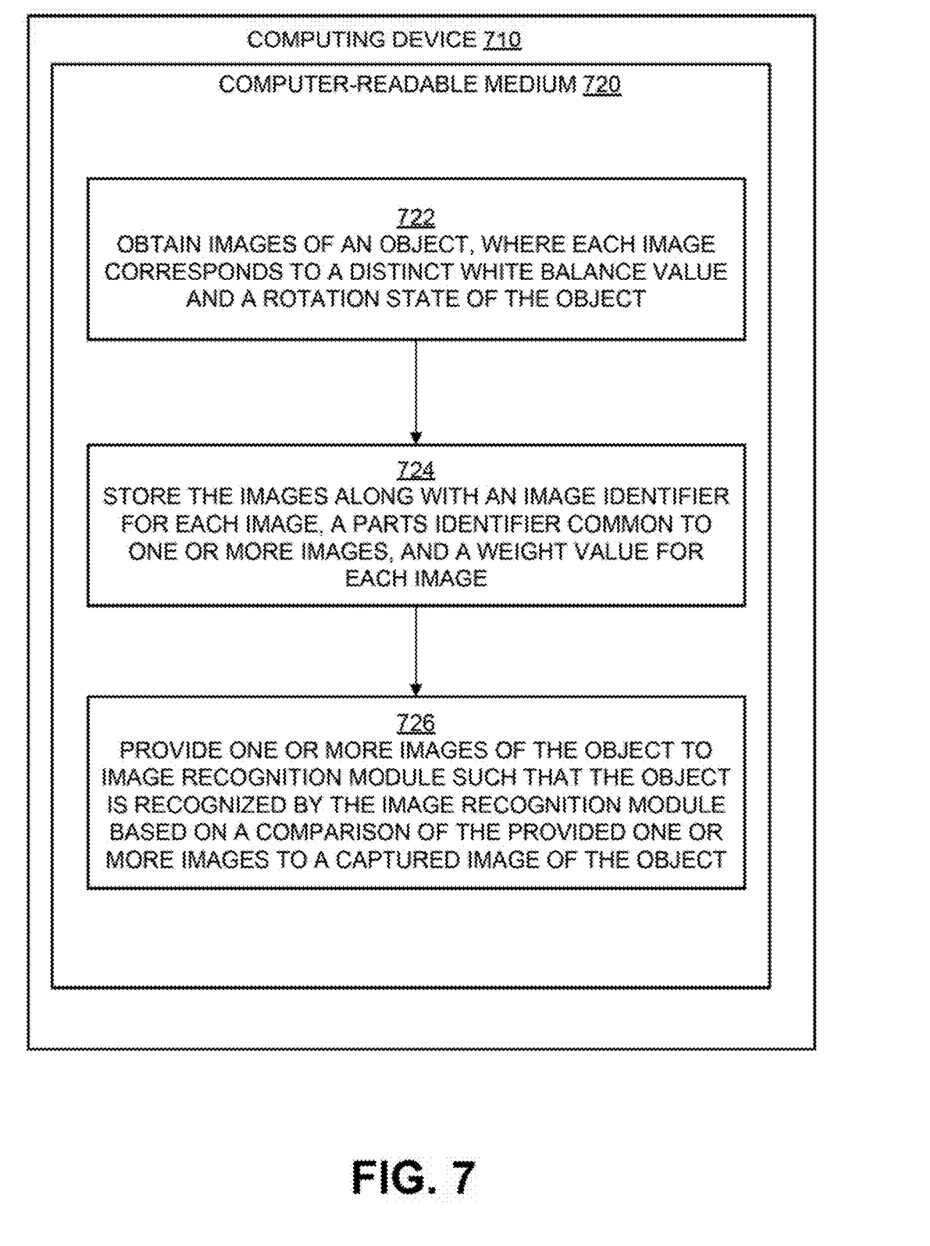
FIG. 7 is a flow diagram illustrating an example process to provide 3D object rotation-based mechanical parts selection through 2D image processing that may be performed by a computing device such as the computing device in FIG. 6.

FIG. 7 is a flow diagram illustrating an example process to provide 3D object rotation-based mechanical parts selection through 2D image processing that may be performed by a computing device such as the computing device in FIG. 6, arranged in accordance with at least some embodiments described herein.

Example methods may include one or more operations, functions or actions as illustrated by one or more of blocks 722, 724, and/or 726, and may in some embodiments be performed by a computing device such as the computing device 600 in FIG. 6. The operations described in the blocks 722-726 may also be stored as computer-executable instructions in a computer-readable medium such as a computer-readable medium 720 of a computing device 710.

An example process to provide 3D object rotation-based mechanical parts selection through 2D image processing may begin with block 722, "OBTAIN IMAGES OF AN OBJECT, WHERE EACH IMAGE CORRESPONDS TO A DISTINCT WHITE BALANCE VALUE AND A ROTATION STATE OF THE OBJECT", where the detection control module 302 may receive a captured image of an object or capture multiple images of the object according to predetermined white balance and rotation state configurations. In case of receiving the image, the detection control module 302 may generate the images by having them processed for white balance and rotation state values through the white balance adjustment module 306 and the parts rotation module 308.

Block 722 may be followed by block 724, "STORE THE IMAGES ALONG WITH AN IMAGE IDENTIFIER FOR EACH IMAGE, A PARTS IDENTIFIER COMMON TO ONE OR MORE IMAGES, AND A WEIGHT VALUE FOR EACH IMAGE", where the detection control module 302 may store the images of the object in a database (e.g., detection learning database 310) along with image and parts identifiers and a weight value for each image. The parts identifiers may be used to indicate images that contain the same object. The weight values may be used to indicate successful matches to a target object.

Block 724 may be followed by block 726, "PROVIDE ONE OR MORE IMAGES OF THE OBJECT TO AN IMAGE RECOGNITION MODULE SUCH THAT THE OBJECT IS RECOGNIZED BY THE IMAGE RECOGNITION MODULE BASED ON A COMPARISON OF THE PROVIDED ONE OR MORE IMAGES TO A CAPTURED IMAGE OF THE OBJECT", where the detection control module 302 may provide a subset of the images to an image recognition module for the image recognition module to match the subset of images to a captured image of a target object and recognize the target object as the objet in one of the images.

The operations included in process 700 are for illustration purposes. 3D object rotation-based mechanical parts selection through 2D image processing may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples FIG. 8 illustrates a block diagram of an example computer program product, arranged in accordance with at least some embodiments described herein.

Figure 8:
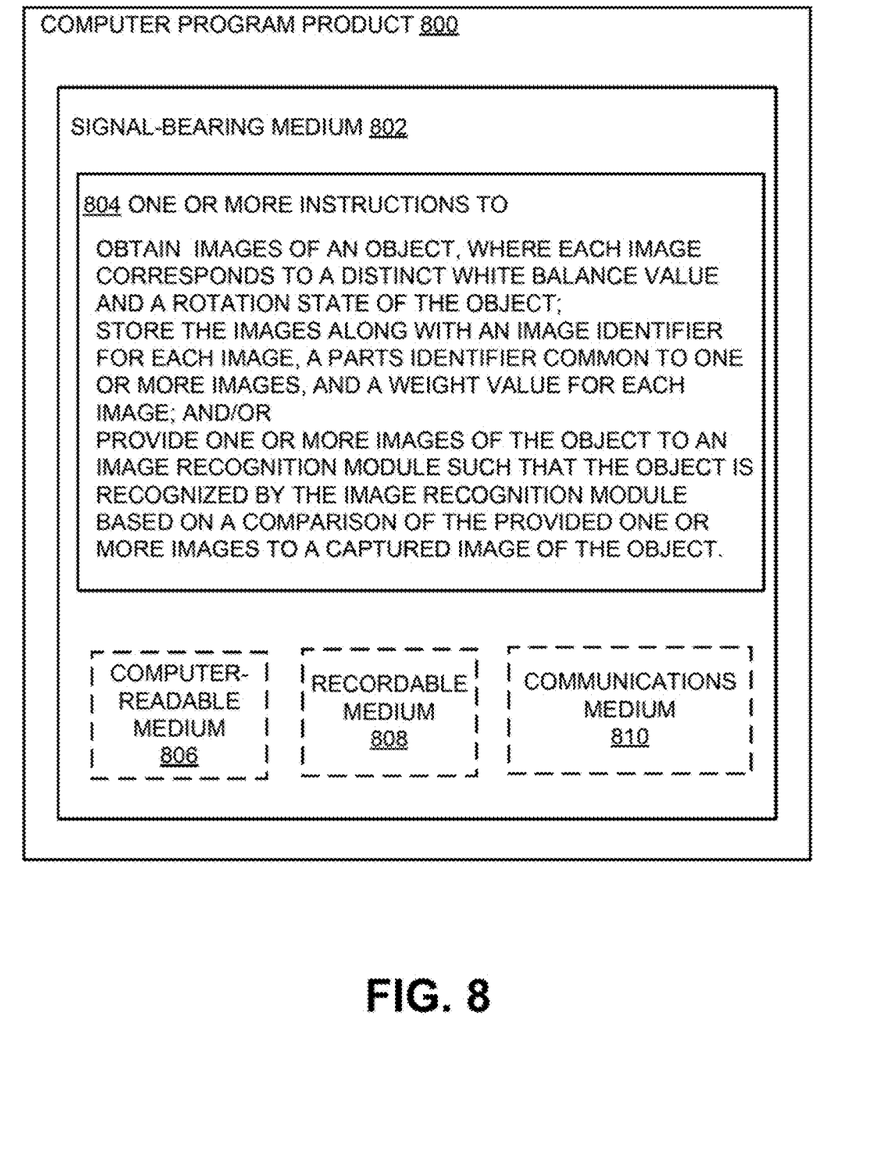
FIG. 8 illustrates a block diagram of an example computer program product, all arranged in accordance with at least some embodiments described herein.

In some examples, as shown in FIG. 8, a computer program product 800 may include a signal bearing medium 802 that may also include one or more machine readable instructions 804 that, when executed by, for example, a processor may provide the functionality described herein. Thus, for example, referring to the processor 604 in FIG. 6, the detection control module 625 and one or more of the other modules may undertake one or more of the tasks shown in FIG. 8 in response to the instructions 804 conveyed to the processor 604 by the medium 802 to perform actions associated with detecting object orientation and/or deformation as described herein. Some of those instructions may include, for example, instructions to obtain images of an object, where each image corresponds to a distinct white balance value and a rotation state of the object; store the images along with an image identifier for each image, a parts identifier common to one or more images, and a weight value for each image; and/or provide one or more images of the object to an image recognition module such that the object is recognized by the image recognition module based on a comparison of the provided one or more images to a captured image of the object, according to some embodiments described herein.

In some implementations, the signal bearing media 802 depicted in FIG. 8 may encompass computer-readable media 806, such as, but not limited to, a hard disc drive, a solid state drive, a compact disc (CD), a digital versatile disc (DVD), a digital tape, memory, etc. In some implementations, the signal bearing media 802 may encompass recordable media 808, such as, but not limited to, memory, read/write (R/W) CDs, R/W DVDs, etc. In some implementations, the signal bearing media 802 may encompass communications media 810, such as, but not limited to, a digital and/or an analog communication medium (e.g., a fiber optic cable, a waveguide, a wired communications link, a wireless communication link, etc.). Thus, for example, the program product 800 may be conveyed to one or more modules of the processor 604 by an RF signal bearing medium, where the signal bearing media 802 is conveyed by the wireless communications media 810 (e.g., a wireless communications medium conforming with the IEEE 802.11 standard).

According to some examples, a method for 3D object recognition through rotation-based 2D image processing is described. An example method may include obtaining images of an object, where each image corresponds to a distinct white balance value and a rotation state of the object; storing the images along with an image identifier for each image, a parts identifier common to one or more images, and a weight value for each image, where the parts identifier indicates images that are associated with a single object; and in response to a request from an image recognition module, providing one or more images of the object to an image recognition module such that the object is recognized by the image recognition module based on a comparison of the provided one or more images to a captured image of the object.

According to other examples, obtaining the images of the object may include one or more of capturing the images at distinct exposure settings and for distinct rotation states of the object; receiving an image of the object; and generating the images of the object from the received image using white balance values and rotation states. Generating the images of the object may include varying a white balance value of the received image incrementally for each of the images. Generating the images of the object from the received image using the rotation states may include detecting a central symmetry axis of the object based on one or more symmetrical features of the object; and generating the images of the object by the expanding and contracting the received image around the central symmetry axis and a second axis.

According to further examples, the method may also include determining a depth and a portion of the object closest to an image capture device by extracting outlines of portions of the object based on a reflectivity of the portions; and combining the portion of the object closest to the image capture device with the images of the object in projection areas corresponding to rotational angles. The second axis may be substantially perpendicular to the central symmetry axis.

According to yet other examples, the method may further include assigning weight values to the stored images. Assigning weight values to the stored images may include assigning an initial weight value to each stored image; and incrementing a weight value of an image that is matched to the captured image of the object by the image recognition module. The method may also include reducing a noise caused by reflection from other objects in each of the images of the object.

According to other examples, a method for 3D object recognition through rotation-based 2D image processing is described. The method may include receiving a captured image of a target object; receiving images from an image database, along with an image identifier for each image, a parts identifier common to one or more images, and a weight value for each image, where the parts identifier indicates images that are associated with an object, and where each image corresponds to a distinct white balance value and a rotation state of the object; comparing the images to the captured image of the target object; and in response to a determination that one of the images matches the captured image of the target object, recognizing the target object as the object associated with the one of the images.

According to some examples, the method may further include in response to a determination that none of the images matches the captured image of the target object, adjusting one or more of a white balance value and a rotation state of the captured image of the target object; and comparing the images to the adjusted captured image of the target object. The method may also include providing feedback associated with the determination to a detection control module configured to manage a database that stores the images such that a weight value of the one of the images is updated at the database or iteratively eliminating inconsistencies due to one or more of a light reflection, a rotation, and a center point or line of the target object.

According to further examples, a system for 3D object rotation-based mechanical parts selection through 2D image processing is described. The system may include a detection control module configured to obtain images of an object, where each image corresponds to a distinct white balance value and a rotation state of the object; store the images along with an image identifier for each image, a parts identifier common to one or more images, and a weight value for each image, where the parts identifier indicates images that are associated with a single object; and in response to a request from an image recognition module, provide one or more images of the object to the image recognition module such that the object is recognized by the image recognition module based on a comparison of the provided one or more images to a captured image of the object.

According to other examples, the detection control module may be configured to obtain the images of the object through capture of the images with an image capture module at distinct exposure settings and for distinct rotation states of the object, or obtain the images of the object by receiving a 2D image of the object and generating the images of the object from the received image using white balance values and rotation states. The system may also include a white balance adjustment module configured to vary a white balance value of the received image incrementally for each of the images.

According to yet other examples, the system may also include a parts rotation module configured to adjust a rotation state of the object in each image by detecting a central symmetry axis of the object based on one or more symmetrical features of the object; and generating the images of the object by the expanding and contracting the received image around the central symmetry axis and a second axis. The parts rotation module may be further configured to determine a depth and a portion of the object closest to an image capture device by extracting outlines of portions of the object based on a reflectivity of the portions; and combine the portion of the object closest to the image capture device with the images of the object in projection areas corresponding to rotational angles.

According to some examples, the second axis may be substantially perpendicular to the central symmetry axis. The detection control module may be further configured to assign weight values to the stored images. The detection control module may be configured to assign weight values to the stored images by assigning an initial weight value to each stored image; and incrementing a weight value of an image that is matched to the captured image of the object by the image recognition module.

According to yet other examples, a system for 3D object rotation-based mechanical parts selection through 2D image processing is described. The system may include a detection control module configured to obtain images of an object, where each image corresponds to a distinct white balance value and a rotation state of the object; store the images along with an image identifier for each image, a parts identifier common to one or more images, and a weight value for each image, where the parts identifier indicates images that are associated with a single object; and in response to a request from an image recognition module, provide one or more images of the object to the image recognition module such that the object is recognized by the image recognition module based on a comparison of the provided one or more images to a captured image of the object. The system may also include an image capture device configured to capture an image of a target object and an object recognition module configured to receive the one or more of the images from the detection control module; compare the one or more of the images to the captured image of the target object; and in response to a determination that one of the images matches the captured image of the target object, recognize the target object as the object associated with the one of the images.

According to further examples, the system may also include a white balance adjustment module configured to vary a white balance value of the received image incrementally for each of the images; and a parts rotation module configured to adjust a rotation state of the object in each image by detecting a central symmetry axis of the object based on one or more symmetrical features of the object; and generating the images of the object by the expanding and contracting the received image around the central symmetry axis and a second axis. The parts rotation module is further configured to determine a depth and a portion of the object closest to an image capture device by extracting outlines of portions of the object based on a reflectivity of the portions; and combine the portion of the object closest to the image capture device with the images of the object in projection areas corresponding to rotational angles. The system may be integrated within parts picker system.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via application specific integrated circuits (ASICs), field programmable gate arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs executing on one or more computers (e.g., as one or more programs executing on one or more computer systems), as one or more programs executing on one or more processors (e.g., as one or more programs executing on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disc, a hard disc drive, a compact disc (CD), a digital versatile disc (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors to move and/or adjust components and/or quantities).

A data processing system may be implemented utilizing any suitable commercially available components, such as those found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for 3D object recognition through rotation-based 2D image processing, the method comprising:
    obtaining a plurality of images of an object, wherein each image corresponds to a distinct white balance value and a rotation state of the object;
    storing the plurality of images along with an image identifier for each image, a parts identifier common to one or more images, and a weight value for each image, wherein the parts identifier indicates images that are associated with a single object;
    in response to a request from an image recognition module, providing one or more images of the object to the image recognition module such that the object is recognized by the image recognition module based on a comparison of the provided one or more images to a captured image of the object;
    determining a depth and a portion of the object closest to an image capture device by extracting outlines of portions of the object based on a reflectivity of the portions;
    combining the portion of the object closest to the image capture device with the plurality of images of the object, wherein the plurality of images depict the object at a plurality of rotational angles; and
    recognizing the 3D object based on the combination and the determination.

2. The method of claim 1, wherein obtaining the plurality of images of the object comprises:
    capturing the plurality of images at distinct exposure settings and for distinct rotation states of the object.

3. The method of claim 1, wherein obtaining the plurality of images of the object comprises:
    receiving an image of the object; and
    generating the plurality of images of the object from the received image using a plurality of white balance values and a plurality of rotation states.

4. The method of claim 3, wherein generating the plurality of images of the object comprises:
    varying a white balance value of the received image incrementally for each of the plurality of images.

5. The method of claim 3, wherein generating the plurality of images of the object from the received image using the plurality of rotation states comprises:

detecting a central symmetry axis of the object based on one or more symmetrical features of the object; and generating the plurality of images of the object by expanding and contracting the received image around the central symmetry axis and a second axis.

6. The method of claim 5, wherein the second axis is substantially perpendicular to the central symmetry axis.

7. The method of claim 1, further comprising:

assigning weight values to the stored plurality of images.

8. The method of claim 7, wherein assigning weight values to the stored plurality of images comprises:

assigning an initial weight value to each stored image; and incrementing a weight value of an image that is matched to the captured image of the object by the image recognition module.

9. The method of claim 1, further comprising:

reducing a noise caused by reflection from other objects in each of the plurality of images of the object.

10. A method for 3D object recognition through rotation-based 2D image processing, the method comprising:

receiving a captured image of a target object;

receiving a plurality of images from an image database, along with an image identifier for each image, a parts identifier common to one or more images, and a weight value for each image, wherein the parts identifier indicates images that are associated with an object, and wherein each image corresponds to a distinct white balance value and a rotation state of the target object;

comparing the plurality of images to the captured image of the target object;

in response to a determination that one of the plurality of images matches the captured image of the target object, recognizing the target object as the object associated with the one of the plurality of images;

determining a depth and a portion of the target object closest to an image capture device by extracting outlines of portions of the target object based on a reflectivity of the portions;

combining the portion of the target object closest to the image capture device with the plurality of images of the target object, wherein the plurality of images depict the target object at a plurality of rotational angles; and recognizing the 3D object based on the combination and the determination.

11. The method of claim 10, further comprising:

in response to a determination that none of the plurality of images matches the captured image of the target object, adjusting one or more of a white balance value and a rotation state of the captured image of the target object; and comparing the plurality of images to the adjusted captured image of the target object.

12. The method of claim 10, further comprising:

providing feedback associated with the determination to a detection control module configured to manage a database that stores the plurality of images such that a weight value of the one of the plurality of images is updated at the database.

13. The method of claim 10, further comprising:

iteratively eliminating inconsistencies due to one or more of a tight reflection, a rotation, and a center point or a line of the target object.

14. A system for 3D object rotation-based mechanical parts selection through 2D image processing, the system comprising:

a computer processor;

a non-transitory computer readable memory connected to the computer processor, the non-transitory computer readable memory storing a detection control module, wherein the detection control module is configured to:

obtain a plurality of images of an object, wherein each image corresponds to a distinct white balance value and a rotation state of the object;

store the plurality of images along with an image identifier for each image, a parts identifier common to one or more images, and a weight value for each image, wherein the parts identifier indicates images that are associated with a single object; and in response to a request from an image recognition module, provide one or more images of the object to the image recognition module such that the object is recognized by the image recognition module based on a comparison of the provided one or more images to a captured image of the object; and a parts rotation module configured to:

determine a depth and a portion of the object closest to an image capture device by extracting outlines of portions of the object based on a reflectivity of the portions; and combine the portion of the object closest to the image capture device with the plurality of images of the object, wherein the plurality of images depict the object at a plurality of rotational angles; and recognize the 3D object based on the combination and the determination.

15. The system of claim 14, wherein the detection control module is configured to obtain the plurality of images of the object through capture of the plurality of images with an image capture module at distinct exposure settings and for distinct rotation states of the object.

16. The system of claim 14, wherein the detection control module is configured to obtain the plurality of images of the object by receiving a 2D image of the object and generating the plurality of images of the object from the received image using a plurality of white balance values and a plurality of rotation states.

17. The system of claim 16, further comprising:

the non-transitory computer readable memory storing a white balance adjustment module, wherein the white balance adjustment module is configured to:

vary a white balance value of the received image incrementally for each of the plurality of images.

18. The system of claim 14, further comprising:

the non-transitory computer readable memory storing the parts rotation module, wherein the parts rotation module is configured to:

adjust a rotation state of the object in each image by:

detecting a central symmetry axis of the object based on one or more symmetrical features of the object; and generating the plurality of images of the object by the expanding and contracting the received image around the central symmetry axis and a second axis.

19. The system of claim 18, wherein the second axis is substantially perpendicular to the central symmetry axis.

20. The system of claim 14, wherein the detection control module is further configured to:
assign weight values to the stored plurality of images.

21. The system of claim 20, wherein the detection control module is configured to assign weight values to the stored plurality of images by:
assigning an initial weight value to each stored image; and
incrementing a weight value of an image that is matched to the captured image of the object by the image recognition module.

22. A system for 3D object rotation-based mechanical parts selection through 2D image processing, the system comprising:
a computer processor;
a non-transitory computer readable memory connected to the computer processor, the non-transitory computer readable memory storing a detection control module, wherein the
detection control module is configured to:
obtain a plurality of images of an object, wherein each image corresponds to a distinct white balance value and a rotation state of the object;
store the plurality of images along with an image identifier for each image, a parts identifier common to one or more images, and a weight value for each image, wherein the parts identifier indicates images that are associated with a single object; and
in response to a request from an image recognition module, provide one or more images of the object to the image recognition module such that the object is recognized by the image recognition module based on a comparison of the provided one or more images to a captured image of the object;
an image capture device configured to:
capture an image of a target object;
the object recognition module configured to:
receive the one or more of the plurality of images from the detection control module;
compare the one or more of the plurality of images to the captured image of the target object; and
in response to a determination that one of the plurality of images matches the captured image of the target object, recognize the target object as the object associated with the one of the plurality of images; and
the non-transitory computer readable memory storing a parts rotation module is further configured to:
determine a depth and a portion of the object closest to an image capture device by extracting outlines of portions of the object based on a reflectivity of the portions; and
combine the portion of the object closest to the image capture device with the plurality of images of the object, wherein the plurality of images depict the object at a plurality of rotational angles.

23. The system of claim 22, further comprising:
the non-transitory computer readable memory storing a white balance adjustment module, wherein the white balance adjustment module is configured to:
vary a white balance value of the received image incrementally for each of the plurality of images; and
further wherein the non-transitory computer readable memory storing the parts rotation module, wherein the parts rotation module is configured to:
adjust a rotation state of the object in each image by:
detecting a central symmetry axis of the object based on one or more symmetrical features of the object; and
generating the plurality of images of the object by the expanding and contracting the received image around the central symmetry axis and a second axis.

24. The system of claim 22, wherein the system is integrated within a parts picker system.

* * * * *

UNITED STATES PATENT AND TRADEMARK OFFICE
CERTIFICATE OF CORRECTION

| | |
|---|---|
| PATENT NO. | : 9,934,563 B2 |
| APPLICATION NO. | : 14/926011 |
| DATED | : April 3, 2018 |
| INVENTOR(S) | : Yoshida |

It is certified that error appears in the above-identified patent and that said Letters Patent is hereby corrected as shown below:

In the Drawings

In Fig. 7, Sheet 7 of 8, insert -- 700 -- as a main designator, therefor.

In the Specification

In Column 7, Line 22, delete "not" and insert -- no --, therefor.

In Column 7, Line 60, delete "one more" and insert -- one or more --, therefor.

In Column 7, Line 60, delete "a level" and insert -- a --, therefor.

In Column 8, Line 45, delete "be pan" and insert -- be part --, therefor.

In Column 10, Line 17, delete "examples" and insert -- examples. --, therefor.

In Column 10, Line 30, delete "the medium 802" and insert -- the signal bearing medium 802 --, therefor.

In Column 10, Line 44, delete "signal bearing media 802" and insert -- signal bearing medium 802 --, therefor.

In Column 10, Lines 45-46, delete "computer-readable media 806," and insert -- computer-readable medium 806, --, therefor.

In Column 10, Line 46, delete "hard disc drive, a solid state drive," and insert -- hard disc drive (HDD), a solid state drive (SSD), --, therefor.

In Column 10, Line 49, delete "signal bearing media 802" and insert -- signal bearing medium 802 --, therefor.

Signed and Sealed this
Tenth Day of July, 2018

Andrei Iancu
*Director of the United States Patent and Trademark Office*

CERTIFICATE OF CORRECTION (continued)
U.S. Pat. No. 9,934,563 B2

In Column 10, Lines 49-50, delete "recordable media 808," and insert -- recordable medium 808, --, therefor.

In Column 10, Line 52, delete "signal bearing media 802" and insert -- signal bearing medium 802 --, therefor.

In Column 10, Lines 52-53, delete "communications media 810," and insert -- communications medium 810, --, therefor.

In Column 10, Line 55, delete "wired communications" and insert -- wired communication --, therefor.

In Column 10, Lines 56-57, delete "the program product 800" and insert -- the computer program product 800 --, therefor.

In Column 10, Line 59, delete "signal bearing media 802" and insert -- signal bearing medium 802 --, therefor.

In Column 10, Line 60, delete "communication media 810" and insert -- communication medium 810 --, therefor.

In Column 14, Line 1, delete "and or" and insert -- and/or --, therefor.

In Column 14, Lines 27-28, delete "hard disc drive," and insert -- hard disc drive (HDD), --, therefor.

In Column 14, Line 32, delete "wired communications" and insert -- wired communication --, therefor.

In Column 15, Line 28, delete "recitation no" and insert -- recitation, no --, therefor.

In Column 15, Line 46, delete "of"two" and insert -- of "two --, therefor.

In Column 15, Line 51, delete "general such" and insert -- general, such --, therefor.

In Column 16, Line 15, delete "or S cells," and insert -- or 5 cells, --, therefor.

In the Claims

In Column 17, Line 66, in Claim 13, delete "a tight" and insert -- a light --, therefor.